United States Patent
Struye et al.

(10) Patent No.: US 7,378,676 B2
(45) Date of Patent: May 27, 2008

(54) STIMULABLE PHOSPHOR SCREENS OR PANELS AND MANUFACTURING CONTROL THEREOF

(75) Inventors: Luc Struye, Mortsel (BE); Paul Leblans, Kontich (BE)

(73) Assignee: Agfa-Gevaert, Mortsel (BE)

( * ) Notice: Subject to any disclaimer, the term of this patent is extended or adjusted under 35 U.S.C. 154(b) by 148 days.

(21) Appl. No.: 11/490,689

(22) Filed: Jul. 21, 2006

(65) Prior Publication Data

US 2006/0257779 A1 Nov. 16, 2006

Related U.S. Application Data

(62) Division of application No. 10/967,614, filed on Oct. 18, 2004, now abandoned.

(30) Foreign Application Priority Data

Oct. 24, 2003 (EP) .................... 03103947

(51) Int. Cl.
*A61B 6/00* (2006.01)
(52) U.S. Cl. .................... 250/583
(58) Field of Classification Search ............. 250/583, 250/484.2, 484.4, 473.1
See application file for complete search history.

(56) References Cited

U.S. PATENT DOCUMENTS

| | | | |
|---|---|---|---|
| 4,336,154 A | 6/1982 | Nishimura et al. | 252/301.4 |
| 4,698,508 A | 10/1987 | Nakamura et al. | 250/484.4 |
| 4,905,265 A | 2/1990 | Cox et al. | 378/99 |
| 5,028,509 A | 7/1991 | Shimada et al. | 430/139 |
| 5,526,394 A | 6/1996 | Siczek et al. | 378/37 |
| 5,596,200 A | 1/1997 | Sharma et al. | 250/370.14 |
| 6,300,640 B1 | 10/2001 | Bhargava et al. | 250/483.1 |
| 6,528,812 B1 | 3/2003 | Leblans et al. | 250/588 |
| 6,899,962 B2 | 5/2005 | Iwabuchi et al. | 428/690 |
| 7,037,446 B2 * | 5/2006 | Isoda et al. | 252/301.4 H |
| 7,091,501 B2 * | 8/2006 | Joly et al. | 250/484.4 |
| 7,135,690 B2 * | 11/2006 | Kaito | 250/484.4 |
| 2003/0104121 A1 | 6/2003 | Leblans et al. | 427/70 |

FOREIGN PATENT DOCUMENTS

| | | |
|---|---|---|
| EP | 1 359204 | 5/2003 |
| WO | WO 01/03156 | 1/2001 |

* cited by examiner

*Primary Examiner*—David Porta
*Assistant Examiner*—Christopher Webb
(74) *Attorney, Agent, or Firm*—Joseph T. Guy; Nexsen Pruet, LLC

(57) ABSTRACT

Stimulable phosphor screens, sheets or panels having alkali metal halide storage phosphors have been disclosed, said phosphors showing emission of red light, after stimulation with an ultraviolet radiation source having a radiation emission maximum of 365 nm, wherein an intensity of red light is not higher than 10% of the blue light emission intensity, and wherein both emission intensities having been measured after stimulation of the said storage phosphors in the phosphor layer of the panel, having stored energy from radiation in the wavelength range shorter than 350 nm.

20 Claims, 1 Drawing Sheet

STIMULABLE PHOSPHOR SCREENS OR PANELS AND MANUFACTURING CONTROL THEREOF

CROSS-REFERENCE TO RELATED APPLICATIONS

The present invention is a divisional application of U.S. patent application Ser. No. 10/967,614 filed Oct. 18, 2004 now abandoned which is pending.

DESCRIPTION

1. Field of the Invention

The present invention relates to a method for controlling sensitivity and homogeneity thereof in the manufacturing of storage phosphor panels.

2. Background of the Invention

Opposite to conventional radiography wherein an intensifying luminescent phosphor screen directly emits luminescent rays and wherein said screen is not a storage medium, radiation image recording and reproducing techniques utilizing a radiation image storage panel, referred to as the stimulable phosphor screen, sheet or panel, are provided with a stimulable phosphor. With radiation image recording and reproducing techniques, the stimulable phosphor of the radiation image storage panel is caused to absorb radiation, which carries image information of an object or which has been radiated out from a sample. Said stimulable phosphor is exposed to stimulating rays, such as visible light or infrared rays, which causes the stimulable phosphor to emit light in proportion to the amount of energy stored thereon during its irradiation exposure.

The emitted fluorescent light is then photoelectrically detected in order to obtain an electric signal. The electric signal is further processed, and the processed electric signal is utilized for reproducing a visible image on a recording material. This way of working, making use of storage phosphor sheets or panels as an intermediate storage medium is also called "computed radiography".

As in radiography it is important to have excellent image quality for the radiologist to make an accurate evaluation of a patient's condition, important image quality aspects are image resolution and image signal-to-noise ratio.

For computed radiography signal-to-noise ratio depends on a number of factors.

First, the number of X-ray quanta absorbed by the storage phosphor screen is important. Signal-to-noise ratio will be proportional to the square-root of the number of absorbed quanta.

Second, the so-called fluorescence noise is important. This noise is caused by the fact that the number of photo-stimulated light (PSL) quanta detected for an absorbed X-ray quantum is small. Since a lot of the PSL light is lost in the detection process in computer radiography, fluorescence noise has an important contribution to the signal-to-noise ratio. It is important that, on the average, at least 1 photon is detected for every absorbed X-ray quantum. If this is not the case, many absorbed X-ray quanta will not contribute to the image and signal-to-noise ratio will be very poor.

This situation is most critical in mammography, where X-ray quanta are used with low energy. Softer X-ray will give rise to less PSL centres and, therefore, to less PSL photons than harder X-rays.

In computer radiography, a number of PSL centres created by the absorbed X-ray quanta. Not all PSL centres are stimulated in the read-out process, because of the limited time available for pixel stimulation and because of the limited laser power available. In practice, only about 30% of the PSL centres is stimulated to give rise to a PSL photon. Since these photons are emitted and scattered in all directions, only 50% of the PSL photons are emitted at the top side of the storage phosphor screen, where they can be detected by the detection system. The emitted PSL photons are guided towards the detector by a light guide. This light guide may consist of an array of optical fibres, that forms rectangular detection area above the storage phosphor screen and has a circular cross-section at the detector side. This type of light guide has a numerical aperture of only 30%, which means that only 1 out of 3 of the emitted PSL photons is guided to the detector. In between the light guide and the detector a filter is placed, which stops the stimulation light reflected by the storage phosphor screen and transmits the PSL light emitted by the screen. This filter also has a small absorption and reflection of PSL light and transmits only ca. 75% of the PSL photons. In computer radiography a photomultiplier is commonly used to transform the PSL signal into an electrical signal. At 440 nm the photomultiplier has a quantum efficiency of ca. 20%. This means that only 1 out of 5 PSL quanta that reach the photomultiplier are detected.

In summary, for 1,000 PSL centres that are created in the storage phosphor screen, only 1,000×0.3×0.5×0.3×0.75×0.2 or 6.75 PSL photons are detected. If it is required that every X-ray quantum gives rise to at least 1 detected PSL photon, therefore, the number of PSL centres created by an X-ray quantum should be sufficiently large. Or, conversely, the X-ray energy required to create a PSL-centre should be sufficiently small.

In mammography, a usual setting of the X-ray source is at 28 kVp. This leads to an X-ray spectrum, where the average energy of an X-ray quantum is of the order of 15 keV. For an X-ray quantum with this energy, in order to give rise to at least 1 detected PSL photon, the energy needed to create a PSL centre should be less than 15,000×6.75/1,000=100 eV.

Furtheron is well-known that fine detail visualisation, high-resolution high-contrast images are required for many X-ray medical imaging systems and particularly in mammography. The resolution of X-ray film/screen and digital mammography systems is currently limited to 20 line pairs/mm and 10 line pairs/mm, respectively. One of the key reasons for this limitation is associated with the phosphor particle size in the currently used X-ray screens. In particular, light scattering by the phosphor particles and their grain boundaries results in loss of spatial resolution and contrast in the image. In order to increase the resolution and contrast, scattering of the visible light must be decreased. Scattering can be decreased by reducing the phosphor particle size while maintaining the phosphor luminescence efficiency. Furthermore, the X-ray to light conversion efficiency, the quantum detection efficiency (e.g. the fraction of absorbed X-rays convertable to light emitted after stimulation) and the screen efficiency (e.g. the fraction of emitted light escaping from the screen after irradiation with stimulating rays) shouldn't be affected in a negative way by the reduction of the phosphor particle size. As a particular advantage the computed radiographic recording and reproducing techniques presented hereinbefore show a radiation image containing a large amount of information, obtainable with a markedly lower dose of radiation than in conventional radiography. Radiation image recording and reprodu-cing techniques are thus efficient, particularly for direct radiography, such as the X-ray image recording for medical diagnosis.

For clinical diagnosis and routine screening of asymptomatic female population, screen-film mammography today still represents the state-of-the-art for early detection of breast cancer. However, screen-film mammography has limitations which reduce its effectiveness. Because of the extremely low differentiation in radiation absorption densities in the breast tissue, image contrast is inherently low. Film noise and scatter radiation further reduce contrast making detection of microcalcifications difficult in the displayed image. So e.g. film gradient must be balanced against the need for wider latitude.

Computed Radiography (CR) systems can be broadly categorized as primary digital and secondary digital systems. Primary digital systems imply direct conversion of the incident radiation on a sensor into usable electrical signals to form a digital image. Secondary digital systems, on the other hand, involve an intermediary step in the conversion of radiation to a digital image. For example, in digital fluoroscopy, image intensifiers are used for intermediary conversion of X-rays into a visible image which is then converted to a digital image using a video camera. Similarly, digital X-ray systems using photostimulated luminescence (PSL) plates, first store the virtual image as chemical energy. In a second step, the stored chemical energy is converted into electrical signals using a laser to scan the PSL plate to form a digital image.

Furthermore, various schemes using silicon photodiode arrays in scanning mode for CR systems have been employed. However, these photodiode arrays require intermediate phosphor screens to convert X-rays into visible light, because of the steep fall-off in quantum efficiency (sensitivity) of the arrays at energies above 10 keV.

The above described secondary digital systems have several disadvantages, including loss in image resolution. Recent technological advances have however made it possible to overcome these difficulties by allowing semiconductor X-ray detectors to be used to generate usable X-ray images. High quality semiconductor X-ray detectors have been known for many years, but these detectors require a very sensitive preamplifier to produce a useable signal. With recent advances in high density analog complementary metal oxide semiconductor (CMOS) integrated circuit technology and high density interconnection between semiconductor chips, the integration of thousands of these detector elements with preamplifiers on a single hybrid integrated circuit, called a sensor chip, is now possible. A semiconductor detector having an absorbing layer located between X-rays from an object and X-ray semiconductor sensors has e.g. further been disclosed in U.S. Pat. No. 4,905,265.

Although significant improvements of clinical image quality in order to eliminate the need for repeated exposures due to poor film image quality caused by factors as radiation scatter noise, fog, blurring, mottle and artifacts have meanwhile been realized in that digital radiographic techniques enable medicines to perform quantitative radiography through image digitization and allows them, by useful enhancement techniques, such as edge enhancement of microcalcifications and transmission of mammograms to remote sites over computer networks; advantageously reducing the absorbed radiation dose received by a patient by at least a factor of seven as compared to screen-film mammography, further facilitating mammography for routine screening of asymptomatic population in the 35 years and older age group by significantly enhancing the benefit to risk equation, furthermore significantly reducing the absorbed dose to the patients during a needle localization biopsy procedure which can require as many as 10 exposures. As has been set forth in U.S. Pat. No. 5,596,200 another advantage of that invention was that it provides improved storage and retrieval of image data through the use of standard magnetic or optical disk media instead of the photographic film, further providing a device which is capital cost competitive with current X-ray imaging systems and which reduces the cost in materials and processing time by eliminating photographic film and associated chemicals, dark rooms and other peripherals, as well as reducing technician's time for film processing.

In determining the desired semiconductor materials therein one has to take into account aspects as ease of fabrication, X-ray absorption, and operating temperature. For mammographic applications, two alternative detector materials, silicon and gallium arsenide, are preferred. Silicon detectors are much easier to fabricate than GaAs detectors, however, the silicon X-ray photon quantum absorption coefficient is much lower than GaAs. For applications in a primary X-ray digital imaging system having X-ray energies greater than approximately 25 keV, sensor materials with much higher X-ray absorption properties are needed. Consequently, GaAs, cadmium telluride, CdZnTe, indium antimonide, and germanium are detector materials should be used at energies greater than 25 keV. The number of rows and columns of detectors and their length and separation can further be changed depending on the specific design requirements of the X-ray imaging system. For example the length of the row and the number of rows can be any desired value up to the limit of the mechanical scan. It is also contemplated to have the sensor chips placed in an array-like fashion.

Since the image generated is isomorphic to the matrix of digital numbers generated during the scan, it can be processed by a signal processing unit 60 with suitable software. For example, the signal-to-noise ratio of the signals can be improved through processing. Data from signal processing are advantageously stored and archived on standard magnetic or optical disk media instead of photographic film. Data from a storage station are then sent to an image processing unit in which a variety of processing operations can be performed on the image. For example, the image processing unit can perform the image manipulations of: (1) magnification; (2) contrast enhancement and windowing; (3) enhancing sharpness and edge gradients; (4) attaching gray or color scales to enhance image quality; and (5) image subtraction. Images generated by image processing can be displayed on a video display, a printer, on film, or sent via image transmission network, which can include satellites or computer networks to send image data from remote radiology laboratories to a centrally located radiologist for virtually real time image interpretation and diagnosis. Applications in other areas of clinical imaging are possible as e.g. for low dose, low cost applications in breast computed tomography (CT); use in intelligent software for computer aided diagnosis (CAD); the stereotactic computerized placement of biopsy needle; and radiation control, monitoring and non-invasive imaging systems for applications in nuclear medicine. An apparatus for imaging a patient's breast by scanning an imaging signal and a receiver across the patient's breast and then constructing a time-delay integration composite image based on the scan has been described in U.S. Pat. No. 5,526,394. Said receiver includes an array of radiation sensitive detector elements, wherein read out of the array is synchronized with the scanning motion of the receiver based on output from position encoder such that synchronisation is maintained despite scan drive variances.

An assembly for allowing selection of an appropriate radiation filter based on particular imaging conditions has also been disclosed therein.

As is well-known a stimulable phosphor to be incorporated in the phosphor-incorporated area, i.a., a phosphor which absorbs not only a radiation having a wavelength of lower than 250 nm but also visible or ultraviolet light in the wavelength region of 250 to 400 nm, giving a stimulated emission of a wavelength in the range of 300 to 500 nm when it is irradiated with stimulating rays of a wavelength in the range of 400 to 900 nm, is preferably employed.

Examples of preferred stimulable phosphors include divalent europium activated (e.g., BaFBr:Eu, BaFBr(I):Eu, Ba(Sr)FBr:Eu) or cerium activated alkaline earth metal halide phosphors, and cerium activated oxyhalide phosphors. Also preferably employable is a phosphor having the formula of $YLuSiO_5$:Ce, Zr.

U.S. Pat. No. 6,300,640 specifically relates to a composite phosphor screen for detecting radiation, particularly X-rays, utilizing nanocrystalline sized phosphors (nanophosphors) disposed in extremely small channels (microchannels) etched in a substrate.

Further improvements in X-ray imaging have been realized by providing needle-shaped $CsBr:Eu^{2+}$ storage phosphor particles in form of a cylinder having an average cross-section diameter in the range from 1 μm to 30 μm (more preferred: from 2 μm up to 15 μm), an average length, measured along the casing of said cylinder, in the range from 100 μm up to 1000 μm (more preferred: from 100 μm up to 500 μm) as described in EP-A 1 359 204.

From a viewpoint of practical use, the stimulable phosphor is desired in order to give stimulated emission in the wavelength region of 300-500 nm when excited with stimulating rays in the wavelength region of 400-850 nm. This is important when the detector is a photomultiplier having the highest quantum efficiency in the blue region. The stimulation light can only be filtered away when the wavelength of the emission light is quite different of the red stimulation light. As has e.g. been illustrated in FIG. 1 of U.S. Pat. No. 4,336,154 a spectrum of stimulated emission produced when the divalent metal fluorohalide phosphor $BaF_2BaBr_2$: 0.0005Eu, 0.01B of that invention was irradiated in advance with X-rays of 80 kVp was excited with a light of 630 nm, stimulated emission of light of a near-ultraviolet to blue color having an emission spectral peak in the neighbourhood of 390 nm was exhibited. Phosphors of varying compositions falling within this range invariably exhibit stimulated emission of light of a near-ultraviolet to blue color and instantaneous emission of light both having emission spectral peaks in the neighbourhood of 390 nm. When said phosphors are stimulated with visible light after exposure to ionizing radiation (such as X-rays, γ-rays, α-rays or far UV-rays, i.e. UV-rays having a wavelength lower than 300 nm), they emit radiation in the red and near infrared region (550 to 750 nm) and in the green wavelength range (480 to 540 nm). The photostimulated emission intensity is increased by introducing metallic elements, in particular tin, iron and nickel, in addition to the alkali metals as has been illustrated in U.S. Pat. No. 4,789,785.

It is clear that upon stimulation with visible light and/or infrared radiation stimulated emission of radiation in the ultraviolet and blue wavelength range is expected. It has been established however that, apart from blue light, even undesired emission of green and red emission light appears, wherein presence of red light more particularly lays burden upon sensitivity.

Experimental evidence has further been found that red light emission, when appearing after stimulation, cannot be due to presence of trivalent Eu-ions. Apart from the red light emission green light has been found as an emission signal. The said signal can even be enhanced by making use of excitation of the phosphor screen with an ultraviolet laser as a long decay time has been measured for the green signal. Indeed a decay time of longer than 200 ms has been measured, opposite to the much shorter decay times (of about 600 ns) of the main blue light and the undesired red light emission.

Red emission stimulated light signals however do not show the same intensity over the whole storage screen or panel. So it has been established that pronounced differences may be observed between the sites in the middle of the panel and at the border thereof. Analysis of a sensitivity profile of the storage phosphor panel indeed is indicative for a decrease in sensitivity on those sites where an enhanced red emission signal is observed. It is thus concluded that presence of red and/or green stimulated light emission signals is disadvantageous from a point of view of sensitivity and/or homogeneity thereof over the whole storage phosphor panel.

OBJECTS AND SUMMARY OF THE INVENTION

Therefor it is a first object of the present invention to provide storage phosphor panels having an excellent and constant sensitivity over the whole panel surface throughout the whole production, without undesired stimulated emission.

It is a further object to provide storage phosphor panels having an excellent and constant sensitivity throughout the production without undesired stimulated emission, up to a certain extent, without exceeding a well-defined threshold value for the said undesired stimulation emission.

Moreover it is an object to provide a method to control sensitivity and homogeneity thereof throughout the manufacturing of storage phosphor panels.

The above-mentioned advantageous effects have been realized by providing stimulable or storage phosphor panels and a method to control the manufacturing thereof, said panels and said method to control them having the specific features set out in the independent claims hereinafter. Specific features for preferred embodiments of the invention are set out in the dependent claims.

Further advantages and embodiments of the present invention will become apparent from the following description and drawing.

DETAILED DESCRIPTION OF THE INVENTION

Figure 1:
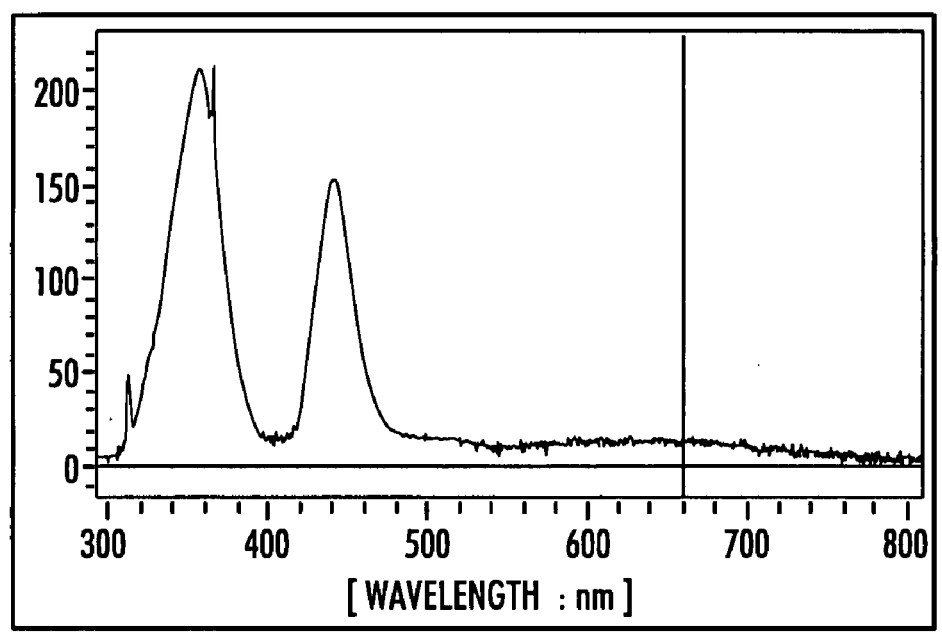
FIG. 1 shows an emission peak of red emitted light upon excitation with ultraviolet radiation of 365 nm, wherein the said "peak" only shows a low intensity. As the wavelength range of the red light emission is extending over a broad region (550 nm up to 750 nm), integration under the curve provides a real, significant signal. Moreover a peak in the green wavelength range appears (480-540 nm).

Storage phosphor panels or parts (sites) thereof showing red or green light emission having an intensity which is not higher than 10% of the blue light emission intensity, both emission intensities appearing after having been stimulated (excited after having stored energy from high energetic radiation like X-rays having an energy in the range from 26 to 200 keV) with an ultraviolet radiation source having an emission maximum of about 365 nm, are clearly showing no dramatic loss in sensitivity upon stimulation.

As becomes clear from the experimental observations as set forth above, an opportunity has been found for controlling the quality of the storage phosphor panels, not only with respect to sensitivity of the storage phosphor panels as such, but also with respect to the production homogeneity over the whole panel surface. Apart from a qualitative control, more particular with respect to homogeneity over the panel surface, a quantitative control with respect to sensitivity, and observed differences thereof, can unambiguously be performed.

A stimulable phosphor screen, the phosphors of which, whether situated in the cental part or at the edges thereof, have stored energy from radiation in the wavelength range shorter than 350 nm, characterized in that a ratio of intensities of red and blue stimulated light, after stimulation of said phosphors with an ultraviolet radiation source having a radiation emission maximum wavelength of 365 nm or more, is not more than 1:10 and, in a preferred embodiment not more than 1:20.

According to the present invention the stimulable phosphor screen has a phosphor which is present in a binderless layer.

In a preferred embodiment according to the present invention the stimulable phosphor screen has a binderless phosphor layer comprising a needle-shaped CsX:Eu phosphor, wherein X represents a halide selected from the group consisting of Br and a combinations of Br with Cl and/or I.

Furthereon according to the present invention a method is offered for controlling manufacturing of stimulable phosphor screens as disclosed hereinbefore, wherein said method comprises the steps of exposing said screens to radiation in the wavelength range shorter than 350 nm, stimulating said screens with an ultraviolet radiation source having a radiation emission maximum wavelength of more than 350 nm, detecting stimulated emission and measuring maximum emission intensities for said emission in the red and blue wavelength range of the visible light spectrum and calculating ratios of said maximum emission intensities.

Making use of this method provides a quantitative selection criterion for the production of panels and the marketing thereof.

So according to the present invention a method is offered, wherein after calculating ratios of more than 1:5, said screens and phosphors are recovered.

An even more stringent criterion according to the present invention is a method, wherein after calculating ratios of more than 1:10, said screens and phosphors are recovered.

In another embodiment according to the present invention, a method of controlling manufacturing of stimulable phosphor screens is developed so that, after calculating differences in ratios between the cental part and at the edges of more than 20%, said screens and phosphors are recovered.

In still another embodiment according to the present invention, a method of controlling manufacturing of stimulable phosphor screens is developed so that after calculating differences in ratios between the cental part and at the edges of more than 10%, said screens and phosphors are recovered.

Furtheron according to the present invention a method of controlling manufacturing of stimulable phosphor screens is offered, wherein detecting maximum emission intensities for said emission in the red and blue wavelength range of the visible light spectrum proceeds with same red and blue light transmitting filters.

The undesired phenomenon of having too high an intensity in the red and near infrared wavelength range was particularly observed with alkali metal halide phosphors, and, according to the present invention in a stimulable phosphor screen, coated with a phosphor present in a binderless layer as well as with a phosphor prepared in powder form and coated in a binder layer material.

The storage phosphor used in phosphor screens of the present invention advantageously is an alkali metal phosphor, having formula I $$M^{1+}X.aM^{2+}X'_2bM^{3+}X''_3:cZ \qquad (I)$$

wherein:
$M^{1+}$ is at least one member selected from the group consisting of Li, Na, K, Cs and Rb,
$M^{2+}$ is at least one member selected from the group consisting of Be, Mg, Ca, Sr, Ba, Zn, Cd, Cu, Pb and Ni,
$M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga,
Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 < c \leq 0.2$. Such phosphors have been disclosed in, e.g., U.S. Pat. No. 5,736,069.

Highly preferred phosphors present in the phosphor screen of the present invention are CsX:Eu stimulable phosphors, wherein X represents a halide selected from the group consisting of Br and a combinations of Br with Cl and/or I.

Those phosphors are preferably prepared by a method comprising the steps of:
 mixing said CsX with between $10^{-3}$ and 5 mol % of an Europium compound selected from the group consisting of $EuX'_2$, $EuX'_3$ and EuOX', X' being a member selected from the group consisting of F, Cl, Br and I,
 firing said mixture at a temperature above 450° C.
 cooling said mixture and
 recovering the CsX:Eu phosphor.

Most preferably a CsBr:Eu stimulable phosphor is present in a storage phosphor panel and the said phosphor is most preferably prepared by the method comprising the steps of:
 mixing said CsX with between $10^{-3}$ and 5 mol % of an Europium compound selected from the group consisting of $EuX'_2$, $EuX'_3$ and EuOX', X' being a member selected from the group consisting of F, Cl, Br and I,
 firing said mixture at a temperature above 450° C.
 cooling said mixture and
 recovering the CsX:Eu phosphor.

Binderless screens can be prepared by bringing the finished phosphor on the support by any method selected from the group consisting of thermal vapor deposition, chemical or physical vapor deposition, electron beam deposition, radio frequency deposition and pulsed laser deposition, without however being limited thereto. It is also possible to bring the alkali metal halide and the dopant together and depositing them both on the support in such a way that the alkali metal phosphor is doped during the manufacture of the screen.

Thus the advantageously applied method for manufacturing a binderless phosphor screen containing a CsX:Eu stimulable phosphor, wherein X represents a halide selected from the group consisting of Br and a combinations of Br with Cl and/or I preferably comprises the steps of:
- bringing multiple containers of said CsX and an Europium compound selected from the group consisting of EuX'$_2$, EuX'$_3$ and EuOX', X' being a halide selected from the group consisting of F, Cl, Br and I in condition for vapor deposition and
- depositing, by a method selected from the group consisting of, thermal vapor deposition, chemical vapor deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of Europium, is formed.

The deposition may proceed from a single container containing a mixture of the starting compounds in the desired proportions. Thus the method further encompasses a method for manufacturing a binderless phosphor screen containing a CsX:Eu stimulable phosphor, wherein X represents a halide selected from the group consisting of In a preferred embodiment according to the present invention the stimulable phosphor screen has a binderless phosphor layer comprising a needle-shaped CsX:Eu phosphor, wherein X represents a halide selected from the group consisting of Br and a combinations of Br with Cl and/or I and wherein said method comprises the steps of:
- mixing said CsX with between $10^{-3}$ and 5 mol % of an Europium compound selected from the group consisting of EuX'$_2$, EuX'$_3$ and EuOX', X' being a halide selected from the group consisting of F, Cl, Br and I;
- bringing said mixture in condition for vapor deposition and
- depositing said mixture on a substrate by a method selected from the group consisting of physical vapor deposition, thermal vapor deposition, chemical vapor deposition, electron beam deposition, radio frequency deposition and pulsed laser deposition.

More preferably a stimulable phosphor screen according to the present invention is a screen, wherein said binderless phosphor layer comprises a binderless needle shaped CsX:Eu phosphor, wherein X represents a halide selected from the group consisting of Br and a combinations of Br with Cl and/or I.

According to the present invention a method of controlling manufacturing of stimulable phosphor screens as set forth above has thus been provided, said method comprising the steps of
- exposing said screens to radiation in the wavelength range shorter than 350 nm,
- stimulating said screens with an ultraviolet radiation source having a radiation emission maximum wavelength of 350 nm or more than 350 nm,
- detecting stimulated emission and measuring maximum emission intensities for said emission in the red and blue wavelength range of the visible light spectrum,
- calculating ratios of said maximum emission intensities.

According to the present invention after calculating ratios of more than 1:5, said screens and phosphors are recovered, i.a. more particularly at least the phosphor itself. A more severe selection is even performed when, according to the present invention, after calculating ratios of more than 1:10, said screens and phosphors are recovered as being commercially unavailable.

In favor of controlling homogeneity of sensitivity over the whole surface of the storage phosphor panel of the present invention a method of controlling manufacturing of stimulable phosphor screens is offered, wherein after calculating differences in ratios between the cental part and at the edges of more than 20%, said screens and phosphors are recovered.

A more severe selection is even made when according to the method of the present invention, after calculating differences in ratios between the cental part and at the edges of more than 10%, said screens and phosphors are recovered.

In favor of handling customer-friendly, according to the present invention a method of controlling manufacturing of stimulable phosphor screens disclosed above has been offered, wherein detecting maximum emission intensities for said emission in the red and blue wavelength range of the visible light spectrum proceeds with same red and blue light transmitting filters. This is particularly favorable with respect to the use of flat screens coated with storage phosphors in form of binderless needle-shaped phosphors and in form of powders. Apart from being present in a binder layer, powders are advantageously present in a homogeneous binderless layer after having been melted.

Moreover not only in the control, but also in the read-out system of the flat storage phosphor plate, another read-out filter would otherwise be required in order to detect a maximized signal and an optimized signal-to-noise ratio.

Just as in U.S. Pat. No. 4,803,359 a method for detecting a radiation image is applied which comprises the steps of: causing the radiation image storage panel of the present invention, which comprises a phosphor layer containing a stimulable phosphor, to absorb radiation having passed through an object or radiated from an object; providing a photosensor composed of numerous photosensitive elements in regular and two-dimensional arrangement; arranging said radiation image storage panel and said photosensor adjacent to each other in the form of layers; irradiating the panel with an electromagnetic wave in order to release the radiation energy stored in the panel as stimulated emission; and photoelectrically detecting the stimulated emission with said photosensor.

EXAMPLES

While the present invention will hereinafter be described in connection with preferred embodiments thereof, it will be understood that it is not intended to limit the invention to those embodiments.

CsBr:Eu screens were made via thermal vapor deposition of CsBr and EuOBr. Therefore CsBr was mixed with EuOBr and placed in a container in a vacuum deposition chamber. The CsBr:Eu phosphor was prepared by the method comprising the steps of:
- mixing said CsBr with between $10^{-3}$ and 5 mol % of EuOBr and bringing said mixture in condition for vapor deposition;
- firing said mixture at a temperature above 450° C. and depositing said mixture on the support by the method of physical vapor deposition;
- cooling said mixture.

More particularly the container with starting materials was heated to a temperature of 750° C. and the phosphor was deposited on a glass disk with a thickness of 1.5 mm and a diameter of 40 mm. The distance between the container and the substrate was 10 cm. During evaporation, the substrate was rotated at 12 r.p.m.

Before the start of the evaporation, the chamber was evacuated to a pressure of 4.10 mbar and during the evaporation process, Ar was introduced in the chamber. The Eu-concentration in the evaporated screens was measured with X-ray fluorescence and was of the order of 800 ppm.

The screens thus prepared, were visually looked at under ultraviolet radiation: it became clear from such visual observations that besides the largest part of the whole phosphor surface emitting blue light, also regions appear wherein emission of red light is observed. Most of those regions are well-defined and are situated more particularly at the edges thereof.

Exposure with X-rays as in practical medical applications unambiguously shows a lower sensitivity (speed) after stimulation with stimulation light in the red to infrared wavelength range for edge regions where emission of red light occurred under the exposure conditions as set forth above.

Experimental evidence has further been found from our experiments on panel surfaces prepared as described above, showing that the sensitivity for photostimulation after X-ray exposure drops down with at least 15% when the intensity of the red emission under UV-excitation or stimulation at 365 nm is higher than 10% of the intensity of the blue emission after excitation at the same wavelength.

Having described in detail preferred embodiments of the current invention, it will now be apparent to those skilled in the art that numerous modifications can be made therein without departing from the scope of the invention as defined in the appending claims hereinafter.

What is claimed is:

1. A stimulable phosphor screen, the phosphors of which, whether situated in the cental part or at the edges thereof, have stored energy from radiation in the wavelength range shorter than 350 nm, characterized in that a ratio of intensities of red and blue stimulated light, after stimulation of said phosphors with an ultraviolet radiation source having a radiation emission maximum wavelength of 365 nm or more, is not more than 1:10 said screen manufactured by:
   exposing said screens to radiation in the wavelength range shorter than 350 nm,
   stimulating said screens with an ultraviolet radiation source having a radiation emission maximum wavelength of more than 350 nm,
   detecting stimulated emission and measuring maximum emission intensities for said emission in the red and blue wavelength range of the visible light spectrum,
   calculating ratios of said maximum emission intensities.

2. A stimulable phosphor screen according to claim 1, wherein said ratio is not more than 1:20 said screen manufactured by:
   exposing said screens to radiation in the wavelength range shorter than 350 nm,
   stimulating said screens with an ultraviolet radiation source having a radiation emission maximum wavelength of more than 350 nm,
   detecting stimulated emission and measuring maximum emission intensities for said emission in the red and blue wavelength range of the visible light spectrum,
   calculating ratios of said maximum emission intensities.

3. A stimulable phosphor screen according to claim 2, wherein said phosphor is present in a binderless layer said screen manufactured by:
   exposing said screens to radiation in the wavelength range shorter than 350 nm,
   stimulating said screens with an ultraviolet radiation source having a radiation emission maximum wavelength of more than 350 nm,
   detecting stimulated emission and measuring maximum emission intensities for said emission in the red and blue wavelength range of the visible light spectrum,
   calculating ratios of said maximum emission intensities.

4. Method of controlling manufacturing of stimulable phosphor screens according to claim 3, wherein detecting maximum emission intensities for said emission in the red and blue wavelength range of the visible light spectrum proceeds with same red and blue light transmitting filters.

5. Method of controlling manufacturing of stimulable phosphor screens according to claim 2, wherein detecting maximum emission intensities for said emission in the red and blue wavelength range of the visible light spectrum proceeds with same red and blue light transmitting filters.

6. A stimulable phosphor screen according to claim 1, wherein said phosphor is present in a binderless layer said screen manufactured by:
   exposing said screens to radiation in the wavelength range shorter than 350 nm,
   stimulating said screens with an ultraviolet radiation source having a radiation emission maximum wavelength of more than 350 nm,
   detecting stimulated emission and measuring maximum emission intensities for said emission in the red and blue wavelength range of the visible light spectrum,
   calculating ratios of said maximum emission intensities.

7. Method of controlling manufacturing of stimulable phosphor screens according to claim 6, wherein detecting maximum emission intensities for said emission in the red and blue wavelength range of the visible light spectrum proceeds with same red and blue light transmitting filters.

8. A stimulable phosphor screen according to claim 1, further comprising a binderless phosphor layer comprising a binderless needle-shaped CsX:Eu phosphor, wherein X represents a halide selected from the group consisting of Br and a combinations of Br with Cl and/or I said screen manufactured by:
   exposing said screens to radiation in the wavelength range shorter than 350 nm,
   stimulating said screens with an ultraviolet radiation source having a radiation emission maximum wavelength of more than 350 nm,
   detecting stimulated emission and measuring maximum emission intensities for said emission in the red and blue wavelength range of the visible light spectrum,
   calculating ratios of said maximum emission intensities.

9. Method of controlling manufacturing of stimulable phosphor screens according to claim 8, wherein detecting maximum emission intensities for said emission in the red and blue wavelength range of the visible light spectrum proceeds with same red and blue light transmitting filters.

10. A stimulable phosphor screen according to claim 1, wherein said binderless phosphor layer comprises a binderless needle-shaped CsX:Eu phosphor, wherein X represents a halide selected from the group consisting of Br and a combinations of Br with Cl and/or I said screen manufactured by:
    exposing said screens to radiation in the wavelength range shorter than 350 nm,
    stimulating said screens with an ultraviolet radiation source having a radiation emission maximum wavelength of more than 350 nm,
    detecting stimulated emission and measuring maximum emission intensities for said emission in the red and blue wavelength range of the visible light spectrum,
    calculating ratios of said maximum emission intensities.

11. Method of controlling manufacturing of stimulable phosphor screens according to claim 10, wherein detecting maximum emission intensities for said emission in the red and blue wavelength range of the visible light spectrum proceeds with same red and blue light transmitting filters.

12. Method according to claim 1, wherein after calculating ratios of more than 1:5, said screens and phosphors are recovered.

13. Method of controlling manufacturing of stimulable phosphor screens according to claim 12, wherein detecting maximum emission intensities for said emission in the red and blue wavelength range of the visible light spectrum proceeds with same red and blue light transmitting filters.

14. Method according to claim 1, wherein after calculating ratios of more than 1:10, said screens and phosphors are recovered.

15. Method of controlling manufacturing of stimulable phosphor screens according to claim 14, wherein detecting maximum emission intensities for said emission in the red and blue wavelength range of the visible light spectrum proceeds with same red and blue light transmitting filters.

16. Method of controlling manufacturing of stimulable phosphor screens according to claim 1, wherein after calculating differences in ratios between the cental part and at the edges of more than 20%, said screens and phosphors are recovered.

17. Method of controlling manufacturing of stimulable phosphor screens according to claim 16, wherein detecting maximum emission intensities for said emission in the red and blue wavelength range of the visible light spectrum proceeds with same red and blue light transmitting filters.

18. Method of controlling manufacturing of stimulable phosphor screens according to claim 1, wherein after calculating differences in ratios between the cental part and at the edges of more than 10%, said screens and phosphors are recovered.

19. Method of controlling manufacturing of stimulable phosphor screens according to claim 18, wherein detecting maximum emission intensities for said emission in the red and blue wavelength range of the visible light spectrum proceeds with same red and blue light transmitting filters.

20. Method of controlling manufacturing of stimulable phosphor screens according to claim 1, wherein detecting maximum emission intensities for said emission in the red and blue wavelength range of the visible light spectrum proceeds with same red and blue light transmitting filters.

* * * * *